Dec. 11, 1956  G. W. KOHLMEYER  2,773,267
WATER CLOSET
Original Filed Oct. 19, 1950  2 Sheets-Sheet 2
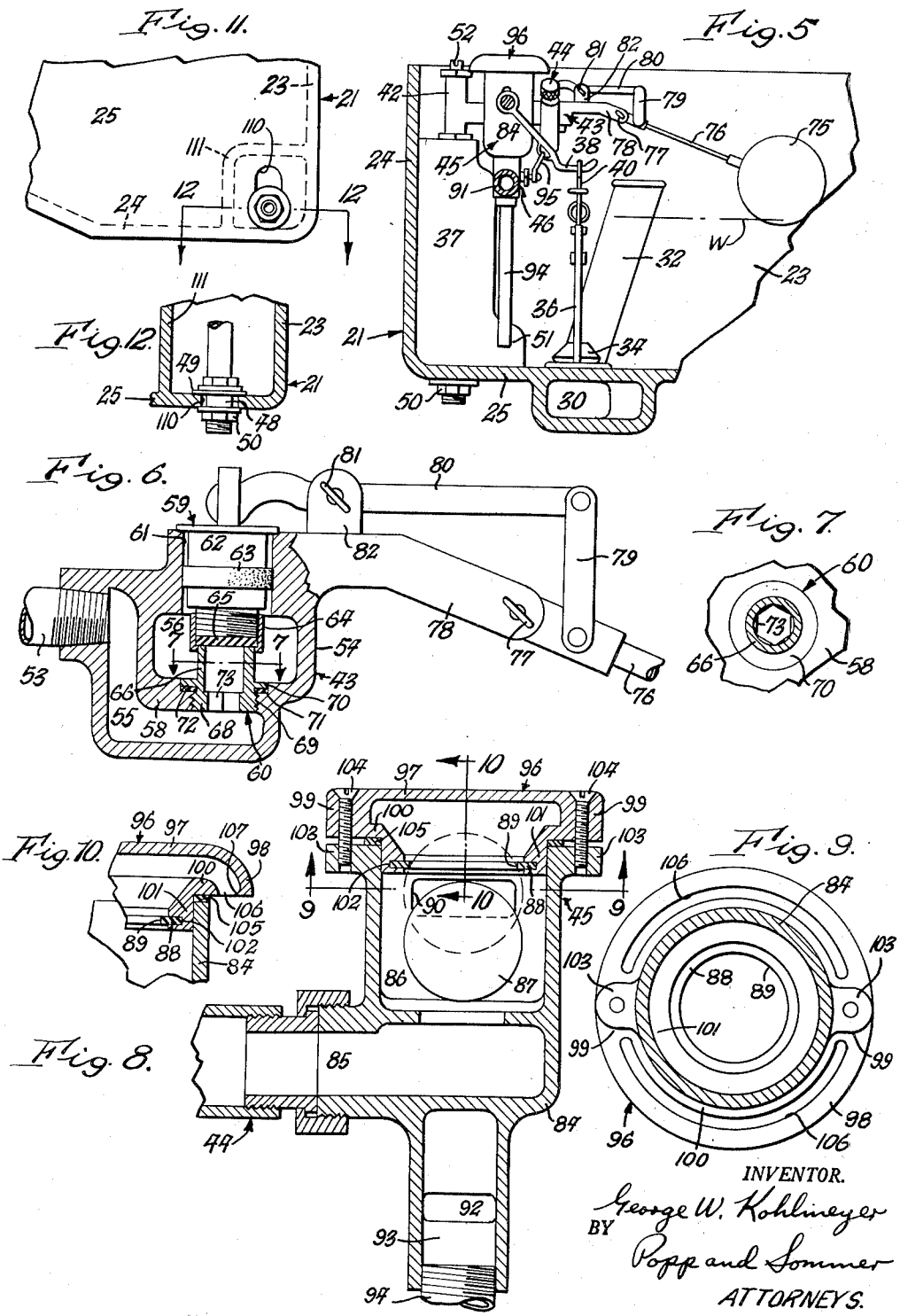
INVENTOR.
George W. Kohlmeyer
BY
Popp and Sommer
ATTORNEYS.

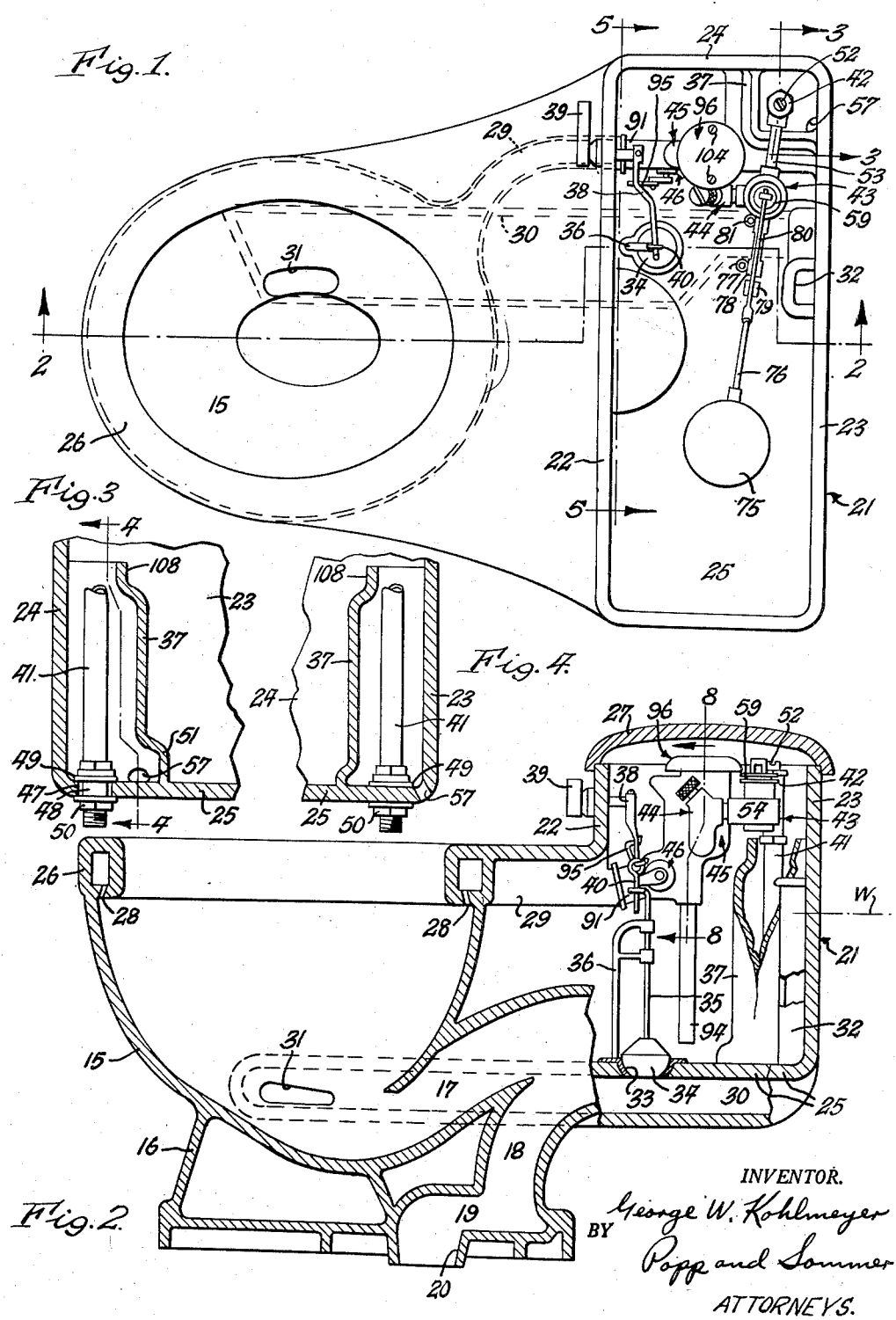

United States Patent Office 2,773,267
Patented Dec. 11, 1956

2,773,267

WATER CLOSET

George W. Kohlmeyer, Buffalo, N. Y., assignor, by mesne assignments, to Case Manufacturing Corporation, Robinson, Ill., a corporation of New York Original application October 19, 1950, Serial No. 191,033. Divided and this application August 22, 1952, Serial No. 305,771

1 Claim. (Cl. 4—13)

This invention relates to improvements in water closets of that type in which the flush valve is located below the level of the rim of the bowl and more particularly to the type in which the tank and bowl are integral and the requisite velocity for flushing is secured by siphonic action.

This application is a division of my copending application Serial No. 191,033, filed October 19, 1950, entitled Water Closet.

Present sanitary regulations governing the installation of plumbing fixtures connected to a safe water supply require such fixtures to be protected against any possible contamination or pollution of the safe water supply. Therefore such fixtures must be equipped so that possible contamination of the safe water supply under vacuum or less than atmospheric pressure conditions is not possible.

It is well known that the contaminated water in plumbing fixtures connected to a safe or potable water supply and not so protected can be drawn backwardly or sucked into the uncontaminated or safe water supply line by means of vacuum or less than atmospheric pressure in said supply line.

One of the several conditions which frequently exists and which would cause a vacuum or subatmospheric condition in the supply lines, is the draining of the water lines in a home or building when repairs are to be made on any part of the plumbing installation. This condition can be and is frequently caused through insufficient water pressure to supply the demand required by the number of fixtures installed and used. This condition can also be caused by the bursting of a water main or by denying supply of water to the building because of fire engines pumping from mains supplying said building. This is particularly liable to occur in water closets having tanks in which water is stored for use in flushing the bowl, and the riser or water inlet pipe extends through the body of the tank and is contacted directly by the body of water stored in the tank. A submerged leak in such riser pipe is difficult to detect and would permit water to flow from the tank into the riser if a vacuum existed in the main water supply line to which the riser is connected. Also, it is common to provide in a water closet tank a hush tube for discharging the incoming water into the tank below the normal level therein. Such hush tube provides another avenue of return flow of contaminated water into the safe water supply.

It is therefore the principal object of the present invention to provide a water supply and control system for a water closet tank which is completely kept from contact with the body of water normally retained within such tank for flushing purposes and hence contamination of the safe water supply is impossible.

Other objects and advantages will be apparent from the following description and accompanying drawings wherein:

Fig. 1 is a top plan view of a water closet embodying my invention and illustrated with the tank cover removed so as to expose the parts arranged within the tank.

Fig. 2 is a vertical sectional view thereof taken on line 2—2 of Fig. 1, certain parts being illustrated as partly broken away.

Fig. 3 is a fragmentary vertical sectional view of the tank and showing the water inlet pipe or riser arranged within a protective channel, this view being taken generally along line 3—3, Fig. 1.

Fig. 4 is similar view thereof but taken on line 4—4, Fig. 3.

Fig. 5 is a fragmentary vertical sectional view of the tank and showing parts of the water supply system therefor, this view being taken on line 5—5, Fig. 1.

Fig. 6 is a vertical central sectional view through the ball cock shown in Fig. 1.

Fig. 7 is a fragmentary horizontal sectional view thereof taken on line 7—7, Fig. 6.

Fig. 8 is a vertical sectional view of the valve body for the atmospheric vent valve and taken generally on line 8—8, Fig. 2.

Fig. 9 is a horizontal sectional view thereof taken on line 9—9, Fig. 8.

Fig. 10 is a fragmentary vertical sectional view thereof taken on line 10—10, Fig. 8.

Fig. 11 is a fragmentary horizontal elevational view of the bottom wall of a tank and showing a modified and adjustable mode of mounting the water inlet pipe or riser on the bottom wall.

Fig. 12 is a fragmentary vertical sectional view thereof taken on line 12—12, Fig. 11.

Referring to Fig. 2, the numeral 15 represents a vitreous china bowl which is supported on a pedestal 16 having arranged therein the usual trap comprising the upwardly and rearwardly extending leg 17, the downwardly extending leg 18 and a laterally extending portion 19 leading to a downwardly facing outlet 20.

A vitreous china tank 21 is shown as being formed integrally with the bowl 15 and extends rearwardly therefrom and also laterally to a greater width than the bowl, as best shown in Fig. 1. The tank 21 includes rear, side and bottom walls 23, 24 and 25 respectively. The rear portion of the bowl 15 and the trap form the front wall of this tank, an upper front wall section 22 being provided above the bowl. A removable lid or cover 27 closes the open upper end of the tank 21.

Surrounding the top of the bowl 15 is a hollow rim 26 provided with a series of apertures 28 adapted to direct streams of water downwardly along the inner surface of the bowl 15. As shown in Fig. 1, the rear of this rim 26 connects with a conduit 29 which extends into the tank 21 and is adapted for connection with a water supply, as hereinafter described.

Below the bottom wall 25 of the tank 21 and to one side of the pedestal 16, the closet is formed to provide a forwardly extending passage 30 which communicates with a port 31 in the side of the bowl 15, this port being below the level of the water seal in the bowl. The passage 30 is also connected with an upwardly extending overflow tube 32 formed integrally with the rear wall 23, this tube rising to a point slightly above the level of the body of flushing water retained within the tank for flushing the bowl. The normal level of water in the tank is indicated by the line W in Figs. 2 and 5. Thus, should water rise to an abnormal height or above the line W, it could overflow through the tube 32 and passage 30 and escape by way of the bowl and trap.

Water within the tank 21 is discharged into the passage 30 for flushing the bowl through a discharge port 33 in the bottom wall 25 of the tank. This discharge port is normally closed by a flush valve 34 having the usual vertical stem 35 slidingly arranged on a guide 36. The flush valve 34 is actuated by a flush lever 38 pivotally arranged on the upper front wall section 22 and manipulated by a handle 39. A link 40 connects the free end of the lever 38 with the upper end of the stem 35 in the usual manner.

Water is supplied to the tank 21 and flushing rim 26 by interconnected means which are shown as including a water inlet pipe or riser 41, a main valve 42, a ball cock 43, a control valve 44, an atmospheric vent valve 45 and a diverter valve 46.

Referring to Figs. 1 and 3, the water inlet pipe or riser 41 is shown as arranged at one corner of the tank adjacent the rear wall thereof and has its lower end extending through a hole 47 in the bottom wall 25 of the tank and is mounted thereon in the usual manner. Thus the lower end of the riser 41 is provided with the usual shank 48 having a flange 49 arranged above and bearing against the bottom wall and a lock nut 50 arranged on the lower threaded end of the shank below the bottom wall and bearing thereagainst. Any suitable main water supply pipe (not shown) can be connected to the threaded lower end of the shank 48.

An important feature of the invention is that the riser pipe 41 is arranged in a conduit or tubular channel which keeps the water in the tank out of contact with this riser pipe. This conduit or channel is shown as provided by an angular imperforate dam wall 37 connected with one side wall 24 and the rear wall 23 of the tank 21. The dam wall 37 is preferably formed by vitreous china and integrally with the tank 21. The height of the dam wall 37 is preferably above the level of the rim 26 so that the bowl 15 will spill water before water in the tank overflows the dam wall 37. In this manner the riser pipe 41 which is carrying the safe water supply is constantly kept out of contact with the body of water in the tank 21 under all conditions so that if this tank water is contaminated it cannot find its way into the riser pipe 41 through any cracks or defects in this pipe. The lower portion of the dam wall 37 is shown as laterally outwardly offset as indicated at 51 (Fig. 3) and this offset portion covers partially at least a drainage hole 57. The drainage hole 57 is preferably provided at the juncture between the bottom and rear walls 25 and 23 respectively as best shown in Fig. 4. If the riser pipe 41 leaks, the escaping water will run onto the floor through the drainage hole 57 and this should attract attention that the closet needs inspection and repair.

The upper end of the riser 41 is connected with the inlet of the main shut-off valve 42 which can be of any suitable type. The outer end of the valve stem of this valve is shown as provided with a slot 52 adapted to receive a screw driver or other suitable tool for turning the valve to open and close the same. The outlet of this main valve 42 is shown as connected with one end of a horizontal pipe 53 which has its other end connected with the inlet of the valve body 54 of the ball cock 43.

As shown in Fig. 6, the valve body 54 of the ball cock is hollow and divided into inlet and outlet compartments 55 and 56 respectively by a partition or inner wall 58. Flow of water from the inlet to the outlet compartment is controlled by a plunger 59 which is movable vertically with respect to a stationary tubular seat member 60 mounted on the partition 58. The plunger 59 is slidingly arranged in a bore 61 in the valve body 54 and is of conventional construction and comprises a cylindrical body 62 surrounded by a gasket 63 engaging the wall of the bore 61. The lower end of the plunger body 62 is reduced and externally threaded to receive a flanged retainer ring 64 which holds a rubber disk 65 on the lower end of this neck.

The tubular seat member 60 has an upper cylindrical section 66 the upper annular edge or rim of which is rounded and adapted to engage the rubber disk 65 on the plunger 59. The lower part 68 of the member 60 is externally threaded and screws into a threaded hole 69 in the partition 58. The upper part of this hole is shown as counterbored to receive an annular collar 70 extending outwardly from the member 60 and this collar seats against a washer or gasket 71 arranged on the upwardly facing shoulder 72.

A hole 73 extending vertically through the lower part 68 of the tubular seat member 60 is out of round in cross section and preferably hexagonal as shown. Thus, by first shutting off the main valve 42 and with the plunger 59 removed from the bore 61, a tool (not shown) having a hexagonal projection can be readily inserted from above the ball cock body 54, through the bore 61 and fitted into the hexagonal opening 73 of the seat member 60. In this manner worn seat members can be readily replaced in an exceedingly simple manner. Heretofore, the seat member for the ball cock plunger was generally arranged on the upper end of the water inlet or riser pipe since this pipe heretofore usually connected directly with the bottom wall of the ball cock valve body, and replacement of the seat involved a major repair necessitating removing the riser pipe. All of this is obviated with the arrangement disclosed herein.

Referring again to the ball cock 43, the plunger 59 is actuated by the conventional float and linkage. Thus the ball float 75 has its arm 76 pivotally connected by the removable pin 77 to a laterally extending arm 78 formed as an integral part of the valve body 54. Links 79 connect the arm 76 to one end of a rock lever 80 the opposite end of which bears against the top of the plunger 59. The rock lever 80 rocks on a removable pivot pin 81 supported on a pair of spaced upstanding lugs 82 rising from the arm 78.

The outlet compartment 56 of the ball cock valve body 54 is suitably connected with the control valve 44 which is adjustable and for the purpose of regulating the flow and pressure of the water throughout the succeeding part of the water supply system. This control valve 44 is preferably of the type which cannot completely shut off the supply of water.

After the water passes through the control valve 44, it enters the hollow valve body 84 of the atmospheric vent valve 45. Referring to Fig. 8, the vent valve body 84 is shown as having its inlet 85 connected with the outlet of the control valve 44. The vent valve body 84 is provided with a compartment 86 communicating with the inlet 85 and containing a spherical float or ball 87. This buoyant ball 87 is adapted to be forced upwardly against a rubber ring 88 which has a central opening 89 smaller than the diameter of the ball. With the ball 87 seated against the ring 88 the upper end of the compartment 86 is closed off and water passes from this compartment through the outlet opening 90 in one wall thereof. However if a vacuum condition maintains in the water supply system, the ball 87 does not seat against the ring 88 and air from the atmosphere passes into the valve body 84 through the vent opening 89 to relieve the vacuum condition.

The water passing through the outlet 90 enters the diverter valve indicated generally at 46 and which valve operates to divert some of the water into a branch conduit 91 connected with the conduit 29 leading to the flushing rim 26, and also to divert some of the water through an opening 92 (Fig. 8) into a compartment 93 arranged below the vent valve body 84. A vertical water outlet pipe or hush tube 94 is connected with the compartment 93. The lower end of the hush tube 94 extends downwardly into the body of water retained within the tank 21. Inasmuch as the details of the diverter valve form no part of the present invention, the same are not herein disclosed, sufficient to say that such diverter valve is connected with and actuated by the actuating lever 38 by means of the link 95 (Figs. 1, 2 and 5).

Referring again to the atmospheric vent valve shown in Fig. 8, should the ball 87 not seat properly on the ring 88 howsoever caused it will be seen that water will be discharged upwardly through the opening 89 in this ring. For example, an obstruction or particle might catch on the ring 88 and prevent the ball 87 from completely closing off the opening 89 and this will cause water under pressure to squirt upwardly and laterally as a spray or stream. Without precaution against this condition, the escaping stream of water might impinge against the joint between the cover 27 and the tank 21, or through the hole in the upper front wall section 22 in which the pivot rod for the handle 39 is arranged, or into the open upper end of the channel provided by the dam wall 37, thereby causing leakage exteriorly of the tank which might drop onto the floor.

Provision is made to prevent such undesirable leakage of water exteriorly of the tank 21 in case the ball 87 does not seat properly on the ring 88 which causes pressurized streams of water to squirt from the opening 89. For this purpose a hood or cap, indicated generally at 96, is arranged on the upper end of the vent valve body 84 for deflecting such streams of water downwardly into the tank 21. The hood or cap 96 comprises a cover portion 97 in the form of a circular plate or disk having a downwardly turned marginal skirt or flange 98 which surrounds the side wall of the valve body 84 in spaced relation thereto. The cover portion 97 is supported above the rim of the valve body 84 by a pair of diametrically opposed lugs 99—99 which connect this cover portion with an annular seat part 100. This annular seat part 100 in turn connects with a depending tubular neck 101 having a cylindrical periphery which closely fits the inner surface of the side wall of the valve body 84. This neck 101 is provided with an internal groove 102 which receives the outer marginal portion of the sealing ring 88 and holes the same so that the inner marginal portion of this ring is flexible and free to be engaged by the ball 87. The hood or cap 96 is preferably formed as a one-piece article.

The hood or cap 96 is removably connected to the vent valve body 84 and for this purpose this body has a pair of diametrically opposed ears 103—103 provided with vertical threaded holes to receive attaching screws 104—104 extending downwardly through holes in the lugs 99 of the hood or cap. A gasket 105 is preferably interposed between the annular seat part 100 of the hood or cover which seats on the upper open end or rim of the vent valve body 84, as shown in Fig. 10. It has been found that such an arrangement permits the hood or cap 96 to be quickly and easily removed, and no freezing of this hood to the vent valve body 84 takes place.

It will be seen that any water squirted past the ring 88 impinges against the hood or cap 96 and is deflected downwardly into the tank 21 through the two arcuate outlets 106—106 provided between the parts 98 and 100 of the hood, as shown in Fig. 9. The inner surface of the skirt portion 98 of the hood adjacent the lower end thereof is preferably directed inwardly and downwardly as indicated at 107 (Fig. 10) so as to direct the escaping water downwardly along the valve body 84. Because the vent valve 45 is arranged adjacent the dam wall 37, the upper end of this wall is preferably inwardly offset as indicated at 108 (Figs. 3 and 4) so that there is even less likelihood of water escaping from the vent valve entering the channel or compartment formed by this dam wall.

Figs. 11 and 12 show a means for adjustably mounting the water inlet pipe or riser 41 on the bottom wall 25 of the tank 21 and at the same time providing drainage for the compartment or channel in which the riser is housed. As there shown the bottom wall 25 is provided with an elongated and enlarged opening 110 the major dimension of which extends generally parallel to the rear wall 23 of the tank. As in the case of the form of the invention shown in Figs. 1–5, the lower end of the riser 41 is mounted by means of a shank 48 and lock nut 50. However in Figs. 11 and 12 the flange 49 of the shank and the lock nut 50 clamp against only a portion of the bottom wall 25 on opposite sides of the elongated opening 110. The length of the elongated opening 110 is such that the flange 49 and locknut 50 do not completely cover this opening thereby leaving a part of this opening uncovered which serves as a drainable hole for the compartment or channel in which the riser 41 is arranged. This compartment or channel is formed jointly by an imperforate dam wall 111 and portions of the rear and side walls 23 and 24 respectively. The dam wall 111 may be similar to the dam wall 37 described in connection with Figs. 1–5. It will thus be seen that the riser 41 is adjustably mounted on the bottom wall 25 and can be shifted relative to the elongated opening 110 so as to bring it into alinement with the water supply pipe (not shown) when installing the fixture. At the same time the uncovered portion or portions of the opening 110 provide drainage for the channel housing the riser 41.

It will also be seen that all of the parts carrying the safe water supply into the tank 21 are arranged above the normal water level line W. The only part extending into the water in the tank is the hush tube 94 and this is on the discharge side of the atmospheric vent valve 45. Accordingly contamination of the safe water supply is impossible.

I claim:

In a water closet bowl having a flushing rim, a tank having a flush valve opening arranged below the upper level of said rim and communicating with the interior of said bowl and a flush valve normally closing said opening, the combination therewith of means for supplying water to said rim and also to said tank to form a body of flushing water therein, said means comprising a diverter valve having dual outlets, one of which supplies water to said rim and the other of which supplies water to said tank, the actuation of said flush and diverter valves being related, an imperforate dam wall arranged inwardly of the side wall of said tank to provide jointly therewith a vertically elongated channel which rises above the normal level of said water body and also above said rim, said channel being unfilled with water, a water supply pipe extending through said channel in spaced relation to the surrounding wall thereof and connected to the safe water supply system, a ball cock and an atmospheric vent valve arranged above said level and connecting the upper end of said pipe with the inlet of said diverter valve, whereby the water on the upstream side of said atmospheric vent valve is isolated from contact with water on the downstream side thereof and the likelihood of contamination of the safe water supply system is minimized.

References Cited in the file of this patent

UNITED STATES PATENTS

| | | |
|---|---|---|
| 1,299,789 | Schuh | Apr. 8, 1918 |
| 1,670,324 | Teahen | May 22, 1928 |
| 1,856,553 | Haring | May 3, 1932 |
| 1,880,296 | Taylor | Oct. 4, 1932 |
| 1,939,118 | Hinsdale | Dec. 12, 1933 |
| 1,971,880 | Taylor | Apr. 19, 1938 |
| 2,114,820 | Smith | Apr. 19, 1938 |
| 2,434,399 | Duckenfield | Jan. 13, 1948 |